Patented Dec. 3, 1946

UNITED STATES PATENT OFFICE 2,411,943

RUBBER COMPOSITIONS CONTAINING INDANOL ESTERS

Frank J. Soday, Baton Rouge, La., assignor to The United Gas Improvement Company, a corporation of Pennsylvania No Drawing. Application February 12, 1944, Serial No. 522,091

10 Claims. (Cl. 260—36)

This invention relates to new compositions of matter comprising natural and/or synthetic rubber and one or more esters of indene-type alcohols.

More particularly, this invention pertains to rubber compositions comprising a mixture of one or more natural and/or synthetic rubbers or elastomers, and one or more esters of indene-type alcohols, either alone or in combination with other softening and/or plasticizing agents.

An object of the invention is to provide natural and/or synthetic rubber compositions suitable for use as tire or tube stocks; for molding and extruding purposes, for the fabrication of printers rolls, hose, sheets, tubes, gaskets, and other objects and specialties; for the preparation of adhesives and cements; and for coating, impregnating, waterproofing, and other specialized uses; comprising one or more natural and/or synthetic rubbers and/or elastomers and one or more esters of indene-type alcohols with or without the incorporation of other additives selected from a list comprising sulfur, accelerators, pigments, resins, antioxidants, fillers, extenders, and/or other plasticizing and/or softening agents, such as stearic acid, pine oil and pine tar. Another object of the invention is the use of esters of indene-type alcohols in conjunction with other ingredients, such as resins, resinous materials, plastic products, and dibutyl phthalate, tricresyl phosphate, or other high boiling compounds, as softening and/or plasticizing agents for natural and/or synthetic rubber. Other objects and advantages of the invention will be apparent to those familiar with the art upon an inspection of the specification and claims.

A considerable number of the softening and/or plasticizing agents employed in rubber compounds, and particularly synthetic rubber compounds, at the present time suffer from many disadvantages, among which is their lack of compatibility with natural and, more particularly, with synthetic rubber. This lack of compatibility renders it extremely difficult to obtain a uniform mixture or dispersion of the softener in the rubber compound, resulting in the production of non-uniform objects or products. In addition, the use of such softening agents frequently results in the leafing or lamination of the rubber compound during the mastication or calendering process. Finally, the incorporation of such incompatible softeners in rubber compounds results in the production of finished objects which frequently exhibit bleeding or blooming during use.

I have discovered that the esters of indene-type alcohols are unusually well adapted for use as softening agents for natural and/or synthetic rubber. Particularly desirable results are obtained when such esters are incorporated in synthetic rubber compositions.

The excellent results obtained when esters of the type described herein are used as plasticizing and/or softening agents for natural and/or synthetic rubber are largely due to the pronounced solubility characteristics of such esters, and their excellent compatibility with natural and/or synthetic rubbers and elastomers. This enables each mill to operate at maximum throughput, with a very substantial saving in power.

The use of such esters in natural and/or synthetic rubber compounding results in the production of uniform compounds and finished articles remarkably free from bleeding, blooming, leafing, or lamination.

In addition the low viscosity characteristics of esters of the type described greatly assists in the milling and blending operations, and insures rapid and complete penetration. Uniform stocks possessing good calendering and extruding characteristics are thus obtained.

Esters of the type described are quite stable and strongly resistant to thermal decomposition, thus insuring the production of uniform compounds and finished articles free from decomposition products. Such compounds, and the finished articles prepared therefrom, possess very good aging characteristics.

These esters also contain substantially no free carbon or other extraneous materials. This is of considerable importance from the standpoint of the preparation of clean, uniform rubber compounds and finished articles and from the standpoint of smooth, trouble-free mill operation.

By a choice of the proper compounding ingredients and reaction conditions, rubber compositions possessing almost any desired property may be obtained readily. Thus, products ranging from very soft, mildly cured types to the so-called hard rubbers may be obtained at will.

Esters of the type desired may be regarded as derivatives of alcohols having the following structural formula

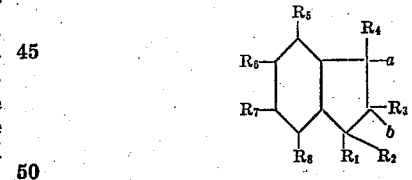

in which one of the group consisting of $a$ and $b$ is an hydroxyl group, the other of said group being hydrogen; and $R_1$, $R_2$, $R_3$, $R_4$, $R_5$, $R_6$, $R_7$, and $R_8$ each represent hydrogen; alkyl such as methyl, ethyl, propyl, butyl, and amyl; or the like. Alcohols of this type are readily esterified with acids to give esters which are unusually stable, light in color, and possess exceptionally desirable odors.

Acids which may be reacted with alcohols of the type described include aliphatic monobasic acids, such as formic, acetic, propionic, butyric, valeric, caproic, oenanthic, caprylic, pelargonic, capric, and similar acids having a higher number of carbon atoms, unsaturated acids, such as acrylic acid, crotonic acid, isocrotonic acid, methacrylic acid, vinylacetic acid, and the like; halogenated fatty acids, such as chloroformic acid, monochloroacetic acid, dichloroacetic acid, alpha-chloropropionic acid, and the like; hydroxy acids, such as glycollic acid, lactic acid, alpha-hydroxybutyric acid, and the like; amino acids, such as glycine, alanine, valine, leucine, and the like; dibasic acids, such as oxalic acid, malonic acid, methyl malonic acid, succinic acid, maleic acid, fumaric acid, and the like; aromatic carboxylic acids, such as benzoic acid, anthranilic acid, salicylic acid, phthalic acid, and the like; and aryl-substituted aliphatic acids, such as phenylacetic acid, hydrocinnamic acid, phenyl propionic acid, cinnamic acid, and the like.

Such esters may be regarded as having the following structural formula

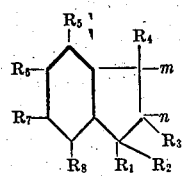

in which one of the group consisting of $m$ and $n$ is an —OOC—X group, in which X is hydrogen; alkyl, such as methyl, ethyl, propyl, butyl, amyl, and the like; alkenyl, such as vinyl; substituted alkyl, such as chloromethyl, hydroxy methyl, and the like; substituted alkenyl, such as methyl vinyl; aryl, such as phenyl and naphthyl; or substituted aryl, such as tolyl, xylyl, phenyl methyl, and the like; the other of said group being hydrogen, and $R_1$ to $R_8$ has the same meaning as before.

Such esters will be referred to herein as indene-type alcohol esters.

Esters in which $R_1$ to $R_8$ are all hydrogen, or esters in which all but one of $R_1$ to $R_8$ are hydrogen are frequently preferred.

The use of alkyl esters of indene-type alcohols as plasticizing agents gives unusually good results in practically all cases. The acetic, propionic, butyric, and valeric acid esters of 1-indanol and 2-indanol and methyl 1-indanol and methyl 2-indanol are particularly desirable plasticizing agents for synthetic rubber.

Such esters may be prepared by the reaction of the desired indene-type alcohol, or mixtures of indene-type alcohols, or derivatives of indene-type alcohols containing an atom or group capable of being replaced with an ester group corresponding to the desired acid or mixture of acids, with the desired acid or anhydride, or salts or derivatives thereof.

The conversion of indene-type derivatives to indene-type alcohol esters of desired acids may be carried out in any suitable manner, and with any suitable esterification apparatus.

Any suitable esterification reagent, such as an acid, its anhydride, its salt or mixtures thereof, may be employed as desired.

For example, acetic acid or acid halides thereof may be employed for the conversion of indene-type alcohols or metallic derivatives thereof to acetates, and salts of acetic acid may be used for the conversion of indene-type halides to acetates.

Illustrative of the salts of acetic acid which may be employed as esterification reagents may be mentioned sodium acetate, potassium acetate, calcium acetate, iron acetate, lead acetate and other salts.

The esterification reaction may be carried out in the presence of a solvent, such as for example, benzene, if desired.

Any suitable reaction temperature may be employed, such as for example, the boiling point of the solution.

The esterification reaction may be carried out at atmospheric, subatmospheric, or superatmospheric pressures, as desired.

The use of a system whereby any water formed by the esterification reaction can be continuously removed from the system will, in general, be found advantageous from the standpoint of the yield of ester secured, as well as from the standpoint of the considerable reduction in time necessary to complete the reaction.

One suitable method for effecting the esterification processes of the present invention comprises refluxing the derivatives with esterification reagents for a period of several hours.

For example, salts of acetic acids may be refluxed with indene-type halides to produce the corresponding indene-type alcohol esters. This reaction may, if desired, be effected in the presence of acetic acid.

The indene-type alcohol esters thus produced may be suitably separated from the halogen salts in the reaction mixture, for example, by filtration.

If acetic acid has been employed in the esterification reaction, it may be removed such as by distillation under reduced pressure. Any unremoved acid may then be neutralized such as with an alkaline solution.

The indene-type alcohol esters obtained by the processes herein described may be isolated and purified in any desired manner.

For example, the reaction mixture may, if desired, be repeatedly extracted with any suitable solvent, such as ether or benzene, to increase the yield and purity of the esters therein.

The extracts may then be combined and dried over a drying agent such as, for example, anhydrous sodium sulfate, after which the extraction solvent employed may be removed by distillation at atmospheric pressure. The residue may then be fractionally distilled in vacuo to obtain a purified ester of the desired type.

Mixtures of two or more indene-type alcohols and/or derivatives, such as a mixture of indene alcohol and methyl indene alcohol, may be esterified, if desired, to give a mixed ester. In this manner, esters having almost any desired range of volatility, and/or other, characteristics may be obtained.

In a similar manner, a mixture of two or more acids, or derivatives thereof may be reacted with one or more indene-type alcohols, or derivatives thereof, to give mixed esters possessing desired physical properties.

For example, a mixture containing the desired proportion of indene hydrohalide and methyl indene hydrohalide may be reacted with a salt of the desired acid to obtain an indene-type alcohol ester fraction. Mixtures containing the desired proportion of indene and methyl indene halides suitable for use in my process may be obtained, for example, by adding a hydrogen halide to a mixture of indene and methyl indene under the proper conditions to give the desired mixture of indene-type halides.

Similarly, a mixture of fatty acids, such as acetic or butyric acids, or derivatives thereof, may be reacted with one or more indene-type alcohols, or derivatives thereof, such as a mixture of indene alcohol and methyl indene alcohol.

When mixtures of such esters are obtained, they may if desired be separated into fractions containing the individual compounds by any suitable method, such as for instance by fractionation.

I have found that certain indene-type alcohols have a pronounced tendency to dehydrate, even upon standing at room temperature, consequently indene-type alcohols should be esterified as soon as possible after formation, and precautions should be taken to avoid dehydrating conditions during esterification.

I prefer to prepare indene-type alcohol esters by the reaction of an indene-type halide with a metallic salt of the desired acid.

The indene and/or substituted indene used in the practice of my invention may be obtained from any desired source although I generally prefer to employ fractions obtained upon the fractionation of light oil obtained by the pyrolysis of petroleum or of petroleum hydrocarbons, as such fractions are substantially free of coumarone and/or substituted coumarone.

In the case of indene, I prefer to use fractions boiling mainly in the range of 175 to 190° C., and more preferably 177 to 185° C.

In the case of substituted indene I prefer to use fractions boiling mainly in the range of 190 to 220° C. Such fractions may be further subdivided, if desired, to give fractions boiling mainly in the range of (a) 190 to 200, (b) 200 to 210, and (c) 210 to 220° C., respectively. The unsaturated hydrocarbons present in such fractions are comprised mainly of methyl indene.

The procedure may be illustrated by the following examples.

Example 1

A 900 cc. portion of a light oil indene fraction having a mid-boiling point of 181° C. and containing 88.4% indene was mixed with 2% methyl alcohol, cooled to 0° C., and saturated with hydrogen chloride. The indene hydrochloride obtained was hydrolyzed with 1.5 liters of water and slightly more than the calculated amount of $CaCO_3$ by heating at 60° C. for 2 hours. The oily layer was separated, dried rapidly with anhydrous sodium sulfate, and fractionated at a pressure of 10 mm. of mercury, absolute, to isolate 1-indanol.

The 1-indanol obtained (B. P.=115–125° C.) then may be esterified according to the methods described previously.

Example 2

One liter of the indene fraction used in Example 1 was cooled to 0° C., 20 cc. of methyl alcohol was added, and hydrogen chloride was passed into the mixture until the theoretical amount had been absorbed. The product was diluted with 500 cc. of acetic acid and 10% more than the calculated amount of anhydrous potassium acetate added. The mixture was refluxed for 5 hours, after which the gelatinous precipitate of KCl was filtered off and the filtrate distilled at a pressure of 10 mm. of mercury absolute. 1-acetoxyindane boiling at 110–121° C. at 10 mm., was obtained. The ester is light in color, unusually stable, and possesses a pleasant, fruity odor.

The use of alkyl or mixed alkyl esters of 1-indanol and/or 2-indanol as a plasticizing agent or agents for natural, and more particularly synthetic, rubber is a preferred embodiment of this invention.

Examples of the rubber or rubber-like materials with which esters of the type described herein may be compounded are the various grades and types of natural rubber and rubber-like materials, and synthetic rubbers or elastomers, such as, for example, those obtained by the polymerization of one or more diolefines, or substituents thereof, such as butadiene, isoprene, piperylene, 2-chlorobutadiene, and the like, either alone, or in admixture, or in combination with one or more unsaturated and/or reactive compounds or materials such as olefines, unsaturated nitriles, acids, esters, ethers, ketones, aldehydes, and/or substituents thereof, such as, for example, styrene, acrylic nitrile, isobutylene, acrylic esters, and the like. Important examples of synthetic rubbers or elastomers are those obtained by the copolymerization of one or more diolefines with (1) acrylic nitrile, (2) styrene or substituents thereof, and/or (3) isobutylene or similar olefines. These materials are known in the art under different trade names, such as, for example, Buna, Buna S, Buna N, Perbunan, Chloroprene, Neoprene, Ameripol, Hycar, Butyl rubber, and the like.

The quantity of esters of the type described herein which may be incorporated in natural or synthetic rubbers, or elastomers, may be varied over very wide limits, depending upon the properties desired. Thus, for example, quantities varying from a few percent, or less, to an amount equal to, or greater than, the quantity of rubber, or rubber mixture, employed in the composition, may be used. I prefer to use from 2% to 50%, and more particularly from 5% to 30% of such esters by weight of the rubber.

In addition to esters of the type described herein, other ingredients which may be incorporated in natural rubber and/or synthetic rubber compositions include vulcanizing agents and/or accelerators, such as, for example, sulfur or sulfur-containing compounds such as tetramethyl-thiuram disulfide mercaptoarylenethiazoles, such as mercaptobenzothiazole, benzothiazyl disulfide, litharge, and dithio carbamates; pigments, such as, for example, magnesium oxide, zinc oxide, and lead oxide; antioxidants, such as, for example, phenyl-alpha-naphthylamine (Neozone A), and phenyl-beta-naphthylamine (Neozone D); reinforcing pigments, such as, for example, carbon blacks, such as channel black, clay, and blanc fixe; fillers and/or diluents, such as, for example, lithopone, barytes, whiting, and asbestine; other softeners and plasticizing agents such as, for example, paraffin wax, factice, dibutyl phthalate, tricresyl phosphate, pine oil, oils, fatty acids, and synthetic or natural resins or resinous materials.

A preferred embodiment of the invention is the use of esters of the type described in conjunction with resins, such as those derived by the polymerization of light oil and/or coal tar fractions containing coumarone and/or indene or the resins derived by the polymerization of the high-boiling monomeric material derived from tar by flash distillation and/or solvent extraction processes, and/or other organic liquids, such as the high-boiling aromatic oils derived by the flash distillation and/or solvent extraction of tar, as softening agents for natural and/or synthetic rubber.

A preferred embodiment of this invention is the use of an aromatic oil of the type described in combination with one or more resinous materials and an ester of the type described as a softener for natural and/or synthetic rubber compositions. A preferred resin for incorporating with the ester and aromatic oil is the resin obtained by the polymerization, by thermal and/or catalytic methods, of certain high-boiling monomeric material separated in monomeric form from tar formed during the production of combustible gas by processes involving the pyrolytic decomposition of petroleum oil with or without the aid of catalysts. Such resins may be formed in situ in aromatic oils of the type described herein.

Another desired resin which may be incorporated in the ester as a softener for natural and/or synthetic rubber is the resin derived by the polymerization of petroleum and/or coal tar fractions containing indene and/or coumarone.

Other desirable ingredients which may be blended with an ester of the type described either alone or in combination with one or more resinous materials and/or aromatic oils, as a softener for natural and/or synthetic rubber include the dimers of petroleum or coal tar fractions containing indene and/or coumarone, dibutyl phthalate, tricresyl phosphate, and pine oil.

Reclaimed rubber is also included among the materials which may be plasticized with the esters herein described, together with natural and/or synthetic rubber, and with or without other ingredients.

The ester or esters, and other ingredients, may be mixed or compounded with the natural rubber and/or synthetic rubber on mixing or compounding rolls or mills, or they may be compounded by any other method known in the art. The rubber composition then may be vulcanized, if desired, by any of the methods employed for this purpose in the art.

Examples of rubber compositions containing esters of the type described herein are as follows:

Example 3

| Component | Parts by weight |
|---|---|
| Natural | 100 |
| 1-acetoxyindane | 10 |
| Zinc | 5 |
| Sulfur | 2.5 |
| Mercaptobenzothiazole | 0.8 |

Example 4

| Component | Parts by weight |
|---|---|
| Pale crepe rubber | 100 |
| Zinc oxide | 45 |
| Sulfur | 2.5 |
| Resin obtained from monomeric material boiling above 210° C. and isolated from petroleum tar | 5 |
| 1-acetoxyindane | 5 |
| Mercaptobenzothiazole | 0.6 |
| Stearic acid | 2 |

Example 5

A natural rubber tire tread mix may be compounded as follows:

| Component | Parts by weight |
|---|---|
| Smoked sheet rubber | 100 |
| Channel black | 40 |
| Zinc oxide | 6 |
| 1-acetoxyindane | 2 |
| Resin obtained from monomeric material boiling above 210° C. and isolated from petroleum tar | 2 |
| Sulfur | 3 |
| Stearic acid | 2 |
| Mercaptobenzothiazole | 0.7 |

Example 6

A synthetic rubber tire tread mix may be compounded as follows:

| Component | Parts by weight |
|---|---|
| Neoprene | 100 |
| Zinc oxide | 5 |
| Mercaptobenzothiazole | 1.25 |
| Channel black | 45 |
| 1-acetoxyindane | 4 |
| Phenyl-alpha-naphthylamine | 2 |
| Sulfur | 1.25 |

Example 7

| Component | Parts by weight |
|---|---|
| Buna S | 80 |
| Plantation crepe | 20 |
| Zinc oxide | 5 |
| Channel black | 50 |
| Age Rite Resin D | 2 |
| Pine tar | 4 |
| 1-acetoxyindane | 3 |
| Stearic acid | 2 |
| Sulfur | 1½ |
| Altax | 2 |

Example 8

| Component | Parts by weight |
|---|---|
| Butadiene-styrene rubber | 100 |
| 1-acetoxyindane | 3 |
| Resin obtained from monomeric material boiling above 210° C. and isolated from petroleum tar | 3 |
| Carbon black | 40 |
| Sulfur | 1.25 |
| Mercaptobenzothiazole | 1.25 |
| Zinc oxide | 5 |
| Phenyl-alpha-naphthylamine | 1 |

Example 9

| Component | Parts by weight |
|---|---|
| Butadiene-acrylic nitrile rubber | 100 |
| 1-acetoxyindane | 2 |
| Resin obtained from monomeric material boiling above 210° C. and isolated from petroleum tar | 3 |
| Carbon black | 30 |
| Sulfur | 1.5 |
| Mercaptobenzothiazole | 1.5 |
| Zinc oxide | 15 |
| Phenyl-alpha-naphthylamine | 2 |

Example 10

| Component | Parts by weight |
|---|---|
| Butadiene-isobutylene rubber | 100 |
| 1-acetoxyindane | 5 |
| Resin obtained from monomeric material boiling above 210° C. and isolated from petroleum tar | 5 |
| Carbon black | 15 |
| Sulfur | 1.25 |
| Mercaptobenzothiazole | 1.25 |
| Phenyl-alpha-naphthylamine | 1 |
| Zinc oxide | 20 |

Example 11

| Component | Parts by weight |
|---|---|
| Perbunan | 100 |
| Zinc oxide | 5 |
| Benzothiazyl disulfide | 1½ |
| Sulfur | 1½ |
| Phenyl-beta-naphthylamine | 1 |
| Channel black | 50 |
| Stearic acid | 1 |
| 1-acetoxyindane | 50 |

The foregoing compositions may be sheeted out, shaped and vulcanized, if desired, such as by the application of a temperature of, say, 140° C. in a press for a period of, say, 45 minutes. Other procedures may, of course, be used, if desired.

Rubber-ester compositions of the type described, either as such or with the incorporation of other ingredients such as the resin and/or aromatic oil derived from monomeric material boiling above 210° C. and isolated from petroleum tar, may be used for a variety of purposes, such as for the manufacture of tires, tubes, and other objects, and as adhesives, coating, impregnating, and waterproofing agents. Such compositions may or may not be vulcanized prior to, during, or subsequent to the use thereof.

Rubber has been defined in the prior art as follows:

A. "An organic material which shows a high elasticity of 100 percent or more at room temperature and which does not lose this property upon storage at room temperature for considerable periods."

B. "A rubber is a substance which shows an elasticity of 800% or more with a quick return (snap) at temperatures at which natural rubber shows the same effect and which does not lose this property upon storage any sooner than does natural rubber."

C. "In order to qualify as a rubber, a material should stretch readily to a considerable degree and after release retract forcefully and quickly."

For the purposes of the claims, I prefer the following definition:

"The term rubber is intended to include elastomers, whether natural or synthetic, and whether or not admixed with other ingredients such as pigments, softening agents, etc. in the vulcanized or unvulcanized state, the said elastomer being (1) capable of vulcanization such as by the application of heat when in admixture with sulfur or other vulcanizing agent, or otherwise, (2) slightly soluble or substantially insoluble in bodied drying oils such as bodied linseed oil, and (3) capable, either in the unvulcanized state or at some stage in the vulcanization thereof, of being stretched readily to a considerable degree and, after release of the applied stress, retracting forcefully and quickly."

While various procedures and formulas have been particularly described these are of course subject to considerable variation. Therefore, it will be understood that the foregoing specific examples are given by way of illustration, and that changes, omissions, additions, substitutions and/or modifications might be made within the scope of the claims without departing from the spirit of the invention, which is intended to be limited only as required by the prior art.

I claim:

1. As a new composition of matter, a material selected from the group consisting of natural rubber and rubber-like polymers of butadiene-1,3, isoprene, piperylene, and 2-chloro-butadiene-1,3 admixed with a carboxylic acid ester of one of a group consisting of indanols and alkyl substituted indanols.

2. As a new composition of matter, a rubber-like butadiene-1,3-styrene copolymer, and as a plasticizer therefor a carboxylic acid ester of one of a group consisting of indanols and alkyl substituted indanols.

3. A rubber composition comprising a synthetic rubber resulting from the copolymerization of butadiene-1,3 with acrylic nitrile and as a plasticizer therefor a carboxylic acid ester of one of a group consisting of indanols and alkyl substituted indanols.

4. As a new composition of matter, natural rubber plasticized with a carboxylic acid ester of one of a group consisting of indanols and alkyl substituted indanols.

5. As a new composition of matter, a material selected from the group consisting of natural rubber and rubber-like polymers of butadiene-1,3, isoprene, piperylene, and 2-chloro-butadiene-1,3 admixed with a fatty acid ester of an idanol as a plasticizing agent.

6. As a new composition of matter, a material selected from the group consisting of natural rubber and rubber-like polymers of butadiene-1,3, isoprene, piperylene and 2-chloro-butadiene-1,3 admixed with 1-acetoxyindanol as a plasticizing agent.

7. As a new composition of matter, a material selected from the group consisting of natural rubber and rubber-like polymers of butadiene-1,3, isoprene, piperylene, and 2-chloro-butadiene-1,3 admixed and a carboxylic acid ester of an indanol as a plasticizing agent.

8. As a new composition of matter, a material selected from the group consisting of natural rubber and rubber-like polymers of butadiene-1,3, isoprene, piperylene, and 2-chloro-butadiene-1,3 admixed with a carboxylic acid ester of a methyl indanol as a plasticizing agent.

9. As a new composition of matter, a material selected from the group consisting of natural rubber and rubber-like polymers of butadiene-1,3, isoprene, piperylene and 2-chloro-butadiene-1,3 plasticized with a butyric acid ester of an indanol.

10. As a new article of manufacture, a vulcanizate obtained by the vulcanization of a rubber composition comprising a material selected from the group consisting of natural rubber and rubber-like polymers of butadiene-1,3, isoprene, piperylene, and 2-chloro-butadiene-1,3 admixed with a carboxylic acid ester of one of a group consisting of indanols and alkyl substituted indanols as a plasticizing agent.

FRANK J. SODAY.